US012717589B2

(12) United States Patent
Balasooriya et al.

(10) Patent No.: US 12,717,589 B2
(45) Date of Patent: Aug. 25, 2026

(54) SYSTEM AND METHODS FOR LOCATION-BASED DEVICE CONFIGURATION

(71) Applicant: ZEBRA TECHNOLOGIES CORPORATION, Lincolnshire, IL (US)

(72) Inventors: Hasith Balasooriya, Piliyandala (LK); Mariya Wright, Cortland Manor, NY (US); Kenneth S. Bhella, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 67 days.

(21) Appl. No.: 18/528,053

(22) Filed: Dec. 4, 2023

(65) Prior Publication Data

US 2025/0181359 A1 Jun. 5, 2025

(51) Int. Cl.
*G06F 9/445* (2018.01)
*G06K 7/14* (2006.01)

(52) U.S. Cl.
CPC ....... *G06F 9/44505* (2013.01); *G06K 7/1413* (2013.01); *G06K 7/1417* (2013.01)

(58) Field of Classification Search
CPC G06F 9/44505; G06K 7/1413; G06K 7/1417; H04W 4/029; H04W 4/02; H04W 64/00; H04W 4/80; H04W 4/023; H04W 64/006; H04W 4/90; H04W 64/003; H04W 84/12; H04W 84/18; H04W 4/20; H04W 4/33; H04W 4/021; H04W 12/122; H04W 4/027; H02J 50/80; H02J 50/20; H02J 50/402; H02J 50/90; H02J 7/00034; H04B 17/318; H04B 5/79; H04B 17/27
See application file for complete search history.

(56) References Cited

U.S. PATENT DOCUMENTS

| | | | | |
|---|---|---|---|---|
| 9,247,380 | B1 * | 1/2016 | Vincent | H04W 4/50 |
| 12,150,186 | B1 * | 11/2024 | Aguilar | G01S 5/0249 |
| 12,382,368 | B2 * | 8/2025 | Friday | H04W 48/08 |
| 2004/0235464 | A1 * | 11/2004 | Korkalo | H04L 67/303 455/418 |
| 2013/0024018 | A1 * | 1/2013 | Chang | H04S 7/302 700/94 |

(Continued)

*Primary Examiner* — Faisal M Zaman

(57) ABSTRACT

Systems and methods for location-based device configuration are disclosed herein. An example system includes one or more processors and one or more memories. The one or more memories may store instructions thereon that, when executed by the processors, are configured to cause the system to: receive a signal that includes first configuration data indicating one or more configuration settings of a device, determine a location of the device based on a received signal strength indicator (RSSI) value associated with the signal, determine whether a configuration update of the device is required by comparing the first configuration data of the device with a second configuration data associated with the location, responsive to determining that the configuration update is required, establish a connection to the device, and transmit a configuration update instruction to the device that causes the device to change a portion of the one or more configuration settings.

20 Claims, 5 Drawing Sheets

(56) References Cited

U.S. PATENT DOCUMENTS

2014/0111380 A1* 4/2014 Gibbs ........................ G01S 5/14
342/451
2014/0187200 A1* 7/2014 Reitter .................... H04W 4/30
455/410
2015/0169312 A1* 6/2015 Patel .................. G06Q 20/3821
717/170
2016/0036956 A1* 2/2016 Debates ............ H04M 1/72406
455/419
2016/0085412 A1* 3/2016 Meganathan ........... H04W 4/02
715/739
2017/0191693 A1* 7/2017 Bruhn ...................... F24F 11/58
2019/0028565 A1* 1/2019 Ramaswamy .......... H04W 4/12
2020/0174779 A1* 6/2020 David ..................... G06F 8/654
2021/0235486 A1* 7/2021 Atefi ................... H04W 74/002
2022/0113953 A1* 4/2022 Biala ....................... H04L 67/12
2022/0201392 A1* 6/2022 Liu .......................... H04R 3/00
2023/0169808 A1* 6/2023 Imanuel ................ H04W 24/08
340/5.61
2024/0168749 A1* 5/2024 Damsgaard ............... G06F 8/65
2024/0259275 A1* 8/2024 Hurford .................. H04L 41/26
2024/0272892 A1* 8/2024 Gupta ....................... G06F 8/65
2025/0117206 A1* 4/2025 Law .......................... G06F 8/65
2025/0141570 A1* 5/2025 Feng ..................... H04L 5/0057

* cited by examiner

SYSTEM AND METHODS FOR LOCATION-BASED DEVICE CONFIGURATION

BACKGROUND

Modern scanning devices bring convenience, flexibility, and maneuverability to data capture workflows. These handheld scanning devices typically benefit from robust remote control/management capabilities. However, conventional techniques for actively controlling and/or managing such scanning devices remotely have various limitations. Accordingly, there is a need for devices and methods to quickly and efficiently control and manage scanning devices remotely, and thereby reduce/eliminate the impact of these limitations.

SUMMARY

In an embodiment, the present invention is a system for location-based device configuration. The system may comprise: one or more processors; and one or more memories storing instructions thereon that, when executed by the one or more processors, are configured to cause the system to: receive a signal that includes configuration data indicating one or more configuration settings of a device, determine a location of the device based on the signal, analyze the location of the device and the configuration data to determine whether a configuration update of the device is required, responsive to determining that the configuration update is required, establish a connection to the device, and transmit a configuration update instruction to the device that causes the device to change a portion of the one or more configuration settings.

In a variation of this embodiment, the configuration data may be a first configuration data, and the instructions, when executed by the one or more processors, may further cause the system to: determine the location of the device based on a received signal strength indicator (RSSI) value associated with the signal; and analyze the location of the device and the first configuration data by comparing the first configuration data with a second configuration data associated with the location. Further in this variation, the instructions, when executed by the one or more processors, may further cause the system to: determine that a first configuration setting indicated in the first configuration data is different from a corresponding second configuration setting in the second configuration data; and determine, based on the first configuration setting differing from the corresponding second configuration setting, that the configuration update is required.

In another variation of this embodiment, the one or more configuration settings may include one or more of: (i) an audio output volume, (ii) an illumination output level, (iii) a symbology capture setting, (iv) a data formatting setting, and (v) a haptic feedback level.

In yet another variation of this embodiment, the connection may comprise at least one of: (i) an instant direct connection to the device via Bluetooth® Low Energy (BLE) having a first transmission size limit or (ii) a fast file transfer channel having a second transmission size limit.

In still another variation of this embodiment, the instructions, when executed by the one or more processors, may further cause the system to: receive a plurality of signals that each include respective configuration data indicating one or more respective configuration settings of a respective device; determine whether any respective device requires a respective configuration update; substantially simultaneously establish a respective connection to each respective device; and transmit a respective configuration update instruction to each device across the respective connections that causes each respective device to change a respective portion of the one or more respective configuration settings.

In yet another variation of this embodiment, the signal may be a BLE signal transmitted by the device as a periodic beacon.

In still another variation of this embodiment, the configuration update instruction may further cause the device to output a feedback response for a user indicating the change of the portion of the one or more configuration settings.

In another embodiment, the present invention is a computer-implemented method for location-based device configuration. The method may comprise: receiving a signal that includes configuration data indicating one or more configuration settings of a device; determining a location of the device based on the signal; analyzing the location of the device and the configuration data to determine whether a configuration update of the device is required; responsive to determining that the configuration update is required, establishing a connection to the device; and transmitting a configuration update instruction to the device that causes the device to change a portion of the one or more configuration settings.

In a variation of this embodiment, the configuration data may be a first configuration data, and the method may further comprise: determining the location of the device based on a received signal strength indicator (RSSI) value associated with the signal; analyzing the location of the device and the first configuration data by comparing the first configuration data with a second configuration data associated with the location; determining that a first configuration setting indicated in the first configuration data is different from a corresponding second configuration setting in the second configuration data; and determining, based on the first configuration setting differing from the corresponding second configuration setting, that the configuration update is required.

In another variation of this embodiment, the one or more configuration settings may include one or more of: (i) an audio output volume, (ii) an illumination output level, (iii) a symbology capture setting, (iv) a data formatting setting, and (v) a haptic feedback level.

In yet another variation of this embodiment, the connection may comprise at least one of: (i) an instant direct connection to the device via Bluetooth® Low Energy (BLE) having a first transmission size limit or (ii) a fast file transfer channel having a second transmission size limit.

In still another variation of this embodiment, the method may further comprise: receiving a plurality of signals that each include respective configuration data indicating one or more respective configuration settings of a respective device; determining whether any respective device requires a respective configuration update; substantially simultaneously establishing a respective connection to each respective device; and transmitting a respective configuration update instruction to each device across the respective connections that causes each respective device to change a respective portion of the one or more respective configuration settings.

In yet another variation of this embodiment, the signal may be a BLE signal transmitted by the device as a periodic beacon.

In still another variation of this embodiment, the configuration update instruction may further cause the device to output a feedback response for a user indicating the change of the portion of the one or more configuration settings.

In yet another embodiment, the present invention is a tangible machine-readable medium comprising instructions for location-based device configuration that, when executed, may cause a machine to at least: receive a signal that includes configuration data indicating one or more configuration settings of a device; determine a location of the device based on the signal; analyze the location of the device and the configuration data to determine whether a configuration update of the device is required; responsive to determining that the configuration update is required, establish a connection to the device; and transmit a configuration update instruction to the device that causes the device to change a portion of the one or more configuration settings.

In a variation of this embodiment, the configuration data may be a first configuration data, and the instructions, when executed, may further cause the machine to at least: determine the location of the device based on a received signal strength indicator (RSSI) value associated with the signal; analyze the location of the device and the first configuration data by comparing the first configuration data with a second configuration data associated with the location; determine that a first configuration setting indicated in the first configuration data is different from a corresponding second configuration setting in the second configuration data; and determine, based on the first configuration setting differing from the corresponding second configuration setting, that the configuration update is required.

In another variation of this embodiment, the one or more configuration settings may include one or more of: (i) an audio output volume, (ii) an illumination output level, (iii) a symbology capture setting, (iv) a data formatting setting, and (v) a haptic feedback level.

In yet another variation of this embodiment, the connection may comprise at least one of: (i) an instant direct connection to the device via Bluetooth® Low Energy (BLE) having a first transmission size limit or (ii) a fast file transfer channel having a second transmission size limit.

In still another variation of this embodiment, the instructions, when executed, may further cause the machine to at least: receive a plurality of signals that each include respective configuration data indicating one or more respective configuration settings of a respective device; determine whether any respective device requires a respective configuration update; substantially simultaneously establish a respective connection to each respective device; and transmit a respective configuration update instruction to each device across the respective connections that causes each respective device to change a respective portion of the one or more respective configuration settings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
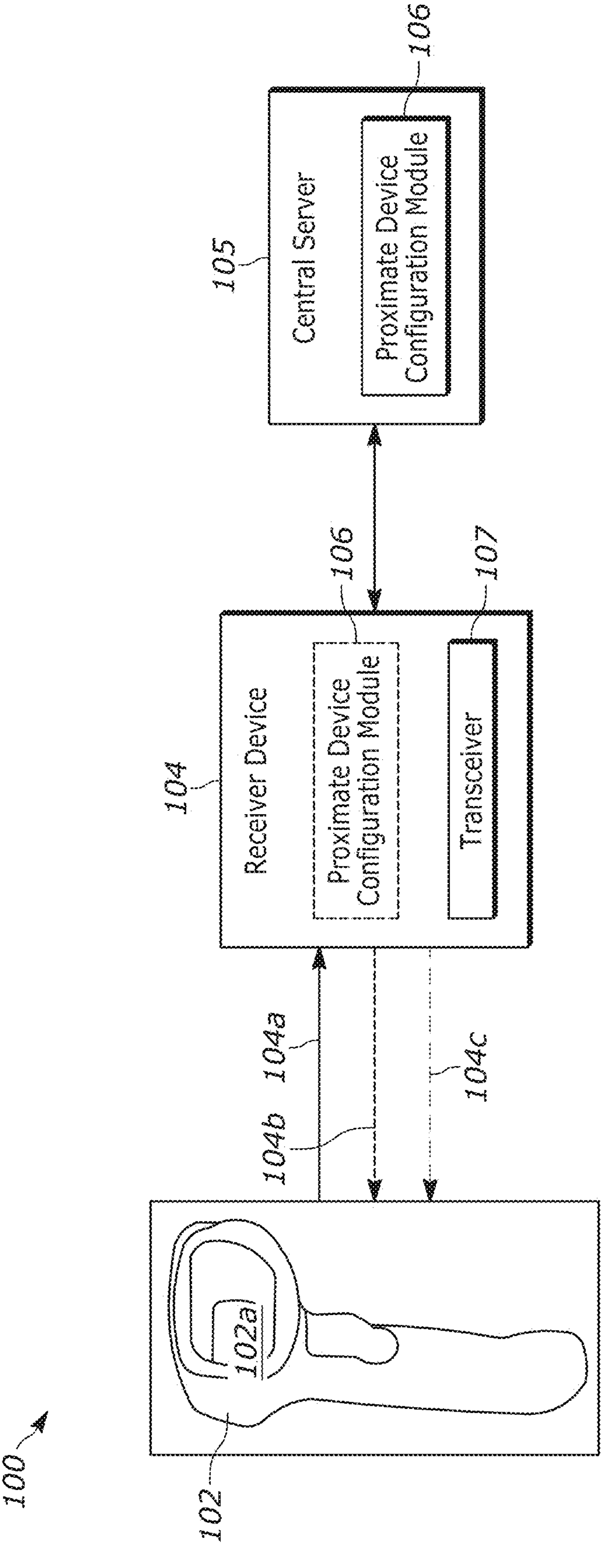
FIG. 1A depicts an example scanning device, receiver device, and a central server configured to establish a connection with and transmit configuration update instructions to the example scanning device, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional techniques for controlling and/or otherwise managing handheld scanning devices suffer from several issues. For example, conventional remote control and/or device management techniques typically require scanning devices to be preconfigured before use in a work environment. Such pre-configuration is frequently based on a known and/or otherwise predetermined location where the scanning device is to be utilized. However, if these scanning devices are removed from the predetermined location, conventional techniques do not allow users to dynamically configure the devices based on their working/current location. As a result, users are often forced to purchase and pre-configure at least one scanning device for each working location.

As an example, some locations within a single working environment may require that the scanning devices operating therein have a high beeper volume, while other locations within the working environment may require that the scanning devices operating therein emit no sound. As another example, blood bags may include a first symbology to be scanned and interpreted by scanning devices at a first location but other items at a second location may include a second symbology requiring different device settings for scanning and/or interpretation. In both examples, conventional techniques are unable to dynamically configure a single scanning device to the required operating parameters/settings (e.g., beeper volume, decoding rules) for various locations within a working environment.

Thus, it is an objective of the present disclosure to eliminate these and other problems with such conventional techniques by providing systems and methods for location-based device configuration. The systems and methods of the present disclosure may ensure that scanning devices are dynamically configured as the device is moved through a working environment, such that a scanning device may be more reliably configured for operation in any location of the working environment. In this manner, the systems and methods of the present disclosure may provide more reliable and effective remote device control and management than conventional techniques.

In accordance with the above, and with the disclosure herein, the present disclosure includes improvements in computer functionality or in improvements to other technologies at least because the present disclosure describes that, e.g., device control systems, and their related various components, may be improved or enhanced with the disclosed methods and systems that provide accurate, reliable, and efficient remote device control/configuration for respective users and administrators. That is, the present disclosure describes improvements in the functioning of a device control system itself or "any other technology or technical field" (e.g., the field of device control/management systems) because the disclosed methods and devices improve and enhance operation of device control/management systems by introducing improved device connection and data transmission techniques that reduce and/or eliminate many inefficiencies typically experienced over time by device control systems lacking such methods and devices. This improves the state of the art at least because such previous device control systems can be inefficient and unreliable due to issues associated with rigidly defined, static device configurations.

In addition, the present disclosure includes applying various features and functionality, as described herein, with, or by use of, a particular machine, e.g., a receiver device, a scanning device, a central server, and/or other hardware components as described herein.

Moreover, the present disclosure includes specific features other than what is well-understood, routine, conventional activity in the field, or adding unconventional steps that demonstrate, in various embodiments, particular useful applications, e.g., receive a signal that includes configuration data indicating one or more configuration settings of a device, determine a location of the device based on the signal, analyze the location of the device and the configuration data to determine whether a configuration update of the device is required, responsive to determining that the configuration update is required, establish a connection to the device, and/or transmit a configuration update instruction to the device that causes the device to change a portion of the one or more configuration settings, among others.

Turning to the Figures, FIG. 1A depicts an exemplary remote control/management scenario 100 including an example scanning device 102, a receiver device 104, and a central server 105. The example scanning device 102 may be, for example, a handheld scanning device configured to capture image data of indicia (e.g., barcodes, quick response (QR) codes, etc.). As part of this exemplary remote control/management scenario 100, the example scanning device 102 may periodically emit a beacon or other similar transmission (e.g., signal 104*a*) via beacon transmitter 102*a* that may be received by any proximate device (e.g., receiver device 104). The signal 104*a* may be, for example, a BLE beacon signal configured to transmit certain information corresponding to the example scanning device 102, such as current configuration settings, remaining battery life, charging connection status, received signal strength indicator (RSSI) values, asset identification information, etc. In any event, the receiver device 104 may receive this signal 104*a* when the receiver device 104 is within the transmission range of the signal 104*a*, or "proximate", transmitted from the example scanning device 102.

The receiver device 104 may receive the signal 104*a*, analyze the data contained in the signal 104*a* using the proximate device configuration module 106, and determine a location of the example scanning device 102. Based on the location of the example scanning device 102, the receiver device 104 may further determine whether to establish a connection 104*b*, 104*c* with the example scanning device 102. As mentioned, the signal 104*a* may include any suitable information about the example scanning device 102, and the receiver device 104 may utilize this information to determine whether the example scanning device 102 requires a configuration update (e.g., based on the current location of the example scanning device 102). If the receiver device 104 determines that such a configuration update is required, then the receiver device 104 may establish a connection 104*b*, 104*c* to the example scanning device 102 to transmit configuration update instructions. The receiver device 104 may be a BLE receiver, BLE gateway, smartphone, cell phone, mobile computer, smart watch, smart glasses, and/or any other suitable device capable of receiving the signal 104*a* from the example scanning device 102.

In certain embodiments, the receiver device 104 may not include the instructions comprising the proximate device configuration module 106 and may transmit the signal 104*a* and/or data derived therefrom to the central server 105 for analysis via the transceiver 107. The central server 105 may analyze the data contained in the signal 104*a* using the proximate device configuration module 106 and determine a location of the example scanning device 102. Based on the location of the example scanning device 102, the central server 105 may further determine whether to instruct the receiver device 104 to establish a connection 104*b*, 104*c* with the example scanning device 102. As referenced herein, any actions performed by the proximate device configuration module 106 stored in the receiver device 104 may additionally or alternatively be performed by the proximate device configuration module 106 stored in the central server 105.

As an example, a user may transport the example scanning device 102 into a location containing the receiver device 104, such that the receiver device 104 may be within and/or come within the beaconing range of the example scanning device 102. The beacon transmitter 102*a* may periodically emit the signal 104*a* as a beacon and/or in accordance with any other suitable communications protocol. The receiver device 104 may receive the signal 104*a*, analyze the dataset included as part of the signal 104*a* using the proximate device configuration module 106 and/or transmit the signal 104*a* to the central server 105, and may determine that a beeper volume level of the example scanning device 102 requires updating/adjusting for operation in the location containing the receiver device 104.

Namely, the proximate device configuration module 106 may determine that the beeper volume level (e.g., 100%) indicated in the signal 104*a* is above a volume threshold (e.g., 15%) corresponding to the current location of the example scanning device 102. The receiver device 104 may also determine that the scanning device 102 should have the beeper volume level updated to comply with the volume threshold. The receiver device 104 may then establish a connection 104*b* with the example scanning device 102, across which, the receiver device 104 may transmit a configuration update instruction causing the example scanning device 102 to reduce the beeper volume level to an appropriate level in compliance with the threshold.

In the prior example, the receiver device 104 may establish the connection 104*b* with the example scanning device 102 to transmit the configuration update instruction related to adjusting the beeper volume level. This example configuration update instruction may not require substantial packet size and/or transmission channel bandwidth to transmit quickly to the example scanning device 102, such that the connection 104*b* may be an instant direct connection to the example scanning device 102 via a BLE protocol that does not require pairing between the scanning device 102 and the receiver device 104. The proximate device configuration module 106 may utilize a similar instant direct connection 104*b* to transmit other configuration update instructions to the scanning device 102.

As another example, the scanning device 102 may transmit a beacon signal 104*a* indicating that the scanning device 102 requires a configuration update to adjust the symbology capture/analysis settings of the device 102. In particular, the beacon signal 104*a* may indicate that the scanning device 102 is configured to capture/analyze barcodes. However, the scanning device 102 may be moved to a location where the predominant indicia is QR codes, such that the scanning device 102 requires a configuration update to change the symbology capture/analysis settings to be optimized for QR code capture/analysis instead of barcode capture/analysis.

In the prior example, the proximate device configuration module 106 may analyze the beacon signal 104*a*, determine that the scanning device 102 requires a configuration update, and may establish the connection 104*c* to the scanning device 102. The proximate device configuration module 106 may also transmit a configuration update instruction to the scanning device 102 across the connection 104*c* to adjust the symbology capture/analysis settings from barcode-optimized settings to QR code-optimized settings.

Moreover, in the prior example, the example configuration update instruction (e.g., adjusting symbology capture/analysis setting(s)) may require substantial packet size and/or transmission channel bandwidth to transmit quickly to the example scanning device 102, such that the connection 104*c* may be a fast file transfer channel to the example scanning device 102 via a communication protocol that may require and/or otherwise utilize pairing between the scanning device 102 and the receiver device 104. The proximate device configuration module 106 may utilize a similar fast file transfer channel 104*c* to transmit other configuration update instructions to the scanning device 102. The fast file transfer channel 104*c* may have a larger transmission size limit than, for example, the instant direct connection 104*b*, as referenced herein.

As yet another example, the scanning device 102 may transmit a beacon signal 104*a* indicating that the scanning device 102 requires a configuration update to lower the illumination levels emitted during an image capture. In particular, the beacon signal 104*a* may indicate that the scanning device 102 is currently configured to emit illumination at a maximum level (e.g., 100%). However, the location of the scanning device 102 may correspond to a required maximum illumination level of 35%, such that the illumination level of the scanning device 102 requires adjustment.

The proximate device configuration module 106 may analyze the beacon signal 104*a*, determine that the illumination level requires reduction, and may establish a connection 104*b*, 104*c* to the scanning device 102. The proximate device configuration module 106 may also transmit a configuration update instruction to the scanning device 102 across the connection 104*b*, 104*c* to adjust the illumination level to an appropriate level (e.g., less than or equal to 35%). Additionally, as part of this configuration adjustment, the configuration update instruction may include instructions that cause the scanning device 102 to output a feedback response for a user indicating the change of the illumination levels. For instance, the feedback response may be or include flashing lights, emitting audible sounds, providing haptic feedback, and/or any other suitable outputs or combinations thereof.

In this manner, the receiver device 104, the central server 105, and the proximate device configuration module 106 may alleviate issues experienced by conventional techniques by dynamically configuring and/or otherwise adjusting configurations of scanning devices (e.g., scanning device 102) based on location. As a result, the central server 105 and/or receiver device 104, in accordance with instructions included as part of the proximate device configuration module 106, may control and/or otherwise manage the scanning device 102 to comply with location-specific configuration requirements. Thus, the instructions included as part of the proximate device configuration module 106 may enable user/operators to seamlessly utilize a single scanning device in numerous environments with various configuration requirements in a manner that was previously unachievable with conventional techniques.

Figure 1B:
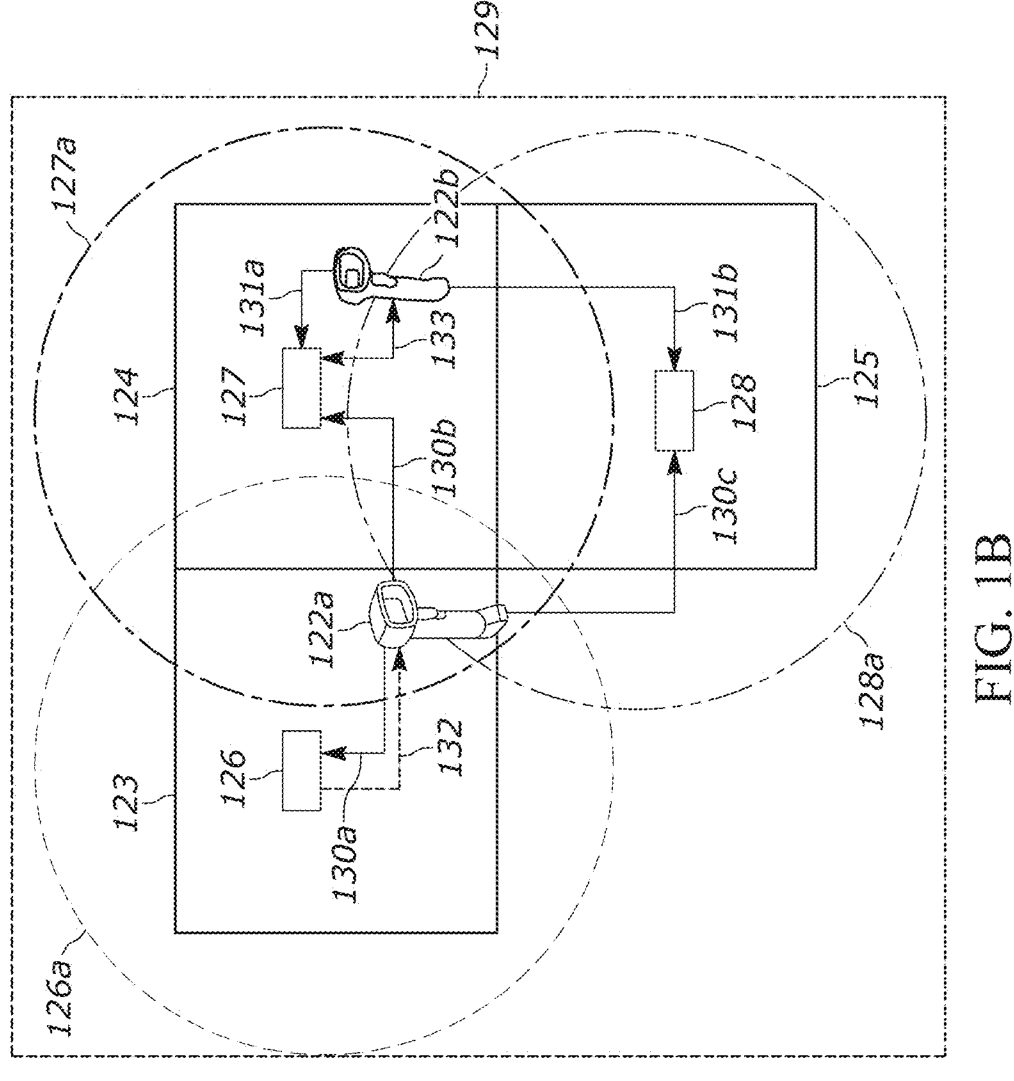
FIG. 1B depicts an example scanning device emitting a beacon that is received by multiple receiving devices to determine a location of the example scanning device for generating/transmitting appropriate configuration update instructions to the example scanning device, in accordance with embodiments described herein.

FIG. 1B depicts example scanning devices 122*a*, 122*b* emitting beacons (e.g., beacon signals 130*a*, 130*b*, 130*c*, 131*a*, 131*b*) that are received by multiple receiving devices 126, 127, 128 to determine a location of the example scanning devices 122*a*, 122*b* for generating/transmitting appropriate configuration update instructions to the example scanning devices 122*a*, 122*b*, in accordance with embodiments described herein. Each of these devices 122*a*, 122*b*, 126, 127, 128 may be included in an example environment 120, and more particularly, a work environment 129 where each receiving device 126, 127, 128 and the scanning devices 122*a*, 122*b* are disposed in one of three rooms 123, 124, 125. The example work environment 129 may be or include, for example, a warehouse, a retail store, a hospital, and/or any other suitable location where the scanning devices 122*a*, 122*b* and the multiple receiving devices 126, 127, 128 may be located.

In certain embodiments, the scanning devices 122*a*, 122*b* may be wireless/cordless scanning devices. For example, the scanning devices 122*a*, 122*b* and each receiving device 126, 127, 128 may have integrated transceivers (not shown) and/or other suitable device(s) that enable the devices 122*a*, 122*b*, 126, 127, 128 to engage in two-way communications, as described herein. These two-way communications may be or include, for example, the scanning devices 122*a*, 122*b* pairing with one or more of the receiving devices 126, 127, 128 as part of establishing a connection (e.g., connections 132, 133) that accommodates large file transfers, such as a fast file transfer connection. Additionally, or alternatively, the two-way communications may not include pairing (e.g., instant direct connect of connection 104*b*) in instances when the receiving devices 126, 127, 128 may transmit smaller files to adjust the configuration of the scanning devices 122*a*, 122*b*.

Further, the scanning devices 122*a*, 122*b* and the receiving devices 126, 127, 128 may have wireless signal transceivers (not shown) configured to transmit and/or receive beacon signals, such as BLE beaconing. This beaconing may be or include the scanning devices 122*a*, 122*b* broadcasting a BLE signal (e.g., beacon signals 130*a-c*, 131*a*, 131*b*) at regular/frequent intervals to allow the receiving devices 126, 127, 128 and/or other nearby devices to determine proximity to and/or current configurations of the scanning devices 122*a*, 122*b*. In particular, the BLE signal may be structured and/or adhere to any suitable protocol (e.g., iBeacon, Eddystone, AltBeacon), and the advertising packets comprising the BLE signal may include multiple user configurable fields. These user configurable fields may enable users to include specific values in the advertising packets that may inform any devices 126, 127, 128 receiving the BLE signals 130*a-c*, 131*a*, 131*b* in a manner desired by the user. For example, and as discussed herein, the user may configure the advertising packets to include indications corresponding to an emitted illumination level setting, emitted audio level setting (e.g., beeper volume), haptic feedback level setting, symbology analysis/capture settings, data formatting settings, remaining battery charge/level, a charging time, a charging placement, etc. of the scanning devices 122*a*, 122*b* at the time the BLE signal 130*a-c*, 131*a*, 131*b* was transmitted. Moreover, it should be appreciated that any suitable type of beaconing, such as Bluetooth® Classic beaconing, Wi-fi Beaconing, active radio frequency identification (RFID) tags, flashing lights, audible tones, and/or combinations thereof may also be used.

In any event, the scanning devices 122*a*, 122*b* may move through the work environment 129 (e.g., carried by a user) and may emit beacon signals 130*a-c*, 131*a*, 131*b* that are received by a plurality of proximate receiver devices 126, 127, 128 when the scanning devices 122*a*, 122*b* satisfy a distance threshold from each receiving device 126, 127, 128. As illustrated in FIG. 1B, the scanning device 122*a* may be proximate to each of the receiving devices 126, 127, 128, as the scanning device 122*a* is within the respective proximity threshold 126*a*, 127*a*, 128*a* of each respective receiving device 126, 127, 128. BY contrast, the scanning device 122*b* is only proximate to the second and third receiving devices 127, 128, as the scanning device 122*b* is only within the respective proximity thresholds 127*a*, 128*a* of the second and third receiving devices 127, 128. In other words, the scanning device 122*a* may be close enough to each receiving device 126, 127, 128, such that beacons emitted by the scanning device 122*a* may be received at the receiving devices 126, 127, 128. Further, the scanning device 122*b* may only be close enough to the second and third receiving devices 127, 128, such that beacons emitted by the scanning device 122*b* may only be received at the second and third receiving devices 127, 128. Regardless, the beacon signal (e.g., beacon signals 130*a-c*, 131*a*, 131*b*) emitted by the scanning devices 122*a*, 122*b* may be received at any suitable number of receiving devices (e.g., receiving devices 126, 127, 128) disposed in any suitable number of locations.

Each signal 130*a-c*, 131*a*, 131*b* transmitted by the scanning devices 122*a*, 122*b* may include a dataset corresponding to the scanning devices 122*a*, 122*b*. These datasets may generally include any suitable information associated with the scanning devices 122*a*, 122*b*, and may more specifically include information such as: a model number, a serial number, a firmware version, a manufacturing date, a configuration name, a location, a signal strength indicator (e.g., RSSI value), emitted illumination level setting, emitted audio level setting (e.g., beeper volume), haptic feedback level setting, symbology analysis/capture settings, data formatting settings, a remaining battery charge value, a charging indicator (e.g., charging, not charging), a charging time indicator (e.g., time since last charged), a motion indicator (e.g., in-motion, static), a cradle docking status, a communication to a host device (e.g., charging cradle, POS station), and/or any other suitable information or combinations thereof.

As illustrated in FIG. 1B, and in certain embodiments, the receiving devices 126, 127, 128 may analyze each respective dataset to determine a set of proximate devices that require configuration updates. In the example environment 120, the first receiving device 126 may receive the signal 130*a* (e.g., beacon) from the first scanning device 122*a* and may analyze this signal 130*a* to determine whether the first scanning device 122*a* requires a configuration update. Further, the second receiving device 127 may receive the signal 131*a* (e.g., beacon) from the second scanning device 122*b* and may analyze this signal 131*a* to determine whether the second scanning device 122*b* requires a configuration update.

In response to determining that the first and second scanning devices 122*a*, 122*b* require configuration updates, the first and second receiving devices 126, 127 may establish respective connections 132, 133 with the scanning devices 122*a*, 122*b* to thereafter transmit respective configuration update instructions to the scanning devices 122*a*, 122*b* across the respective connections 132, 133. These configuration update instructions may cause the scanning devices 122*a*, 122*b* to change a respective portion of their respective configuration settings. Of course, in certain instances, a single receiving device (e.g., 126, 127, or 128) may substantially simultaneously establish connections with any suitable number of scanning devices (e.g., 122*a*, 122*b*) to transmit any suitable configuration update instructions to the scanning devices.

Further, as illustrated in FIG. 1B, the receiving devices 126, 127, 128 may determine which device 126, 127, 128 may establish a connection with the scanning devices 122*a*, 122*b* by first determining the current location of the scanning devices 122*a*, 122*b*. For example, the first scanning device 122*a* may transmit signals 130*a-c* to each of the receiving devices 126, 127, 128 because the first scanning device 122*a* is within the respective proximity thresholds 126*a*, 127*a*, 128*a* for each receiving device 126, 127, 128. Each receiving device 126, 127, 128 may analyze the dataset from the first scanning device 122*a* signals 130*a-c*, and may evaluate/compare the respective RSSI values corresponding to each received signal 130*a-c* to determine the location of the first scanning device 122*a*. As illustrated in FIG. 1B, the first receiving device 126 may determine that the RSSI value corresponding to the received signal 130*a* is relatively high, the second receiving device 127 may determine that the RSSI value corresponding to the received signal 130*b* is lower than the first signal 130*a*, and the third receiving device 128 may determine that the RSSI value corresponding to the received signal 130*c* has a lower value than both the other two signals 130*a*, 130*b*. This relative RSSI value comparison may be performed by the individual receiving devices 126, 127, 128 when they collectively share data across a network (e.g., wireless communications network), and/or may be performed at a central location (e.g., central server 105) which receives/analyzes the datasets from each receiving device 126, 127, 128.

In any event, based on the RSSI values, the receiving devices 126, 127, 128 and/or the central server may determine that the first scanning device 122*a* is located in the first room 123. Thus, if the first scanning device 122*a* requires a configuration update, the first receiving device 126 may establish a connection 132 with the first scanning device 122*a* to transmit the configuration update instruction(s). The first receiving device 126 and/or the central server may analyze the dataset included in the signal 130*a*, determine that the first scanning device 122*a* requires an adjustment to the haptic feedback settings, and the first receiving device 126 may establish the connection 132 (e.g., instant direct connect via BLE, fast file transfer connection) to the first scanning device 122*a*. The first receiving device 126 may then transmit a configuration update instruction to the first scanning device 122*a* across the connection 132 to cause the first scanning device 122*a* to adjust the haptic feedback settings in accordance with the requirements corresponding to the first room 123.

As another example, the second scanning device **122*b* may transmit signals 131*a*, 131*b* to the second and third receiving devices 127, 128 because the second scanning device 122*b* is within the respective proximity thresholds 127*a*, 128*a* for the second and third receiving devices 127, 128. Each receiving device 127, 128 may analyze the dataset from the second scanning device 122*b* signals 131*a*, 131*b*, and may evaluate/compare the respective RSSI values corresponding to each received signal 131*a*, 131*b* to determine the location of the second scanning device 122*b*. As illustrated in FIG. 1B, the second receiving device 127 may determine that the RSSI value corresponding to the received signal 131*a* is relatively high, and the third receiving device 128 may determine that the RSSI value corresponding to the received signal 131*b* has a lower value than the other signals 131*a*. This relative RSSI value comparison may be performed by the individual receiving devices 127, 128 when they collectively share data across a network (e.g., wireless communications network), and/or may be performed at a central location (e.g., central server 105) which receives/analyzes the datasets from each receiving device 127, 128**.

In any event, based on the RSSI values, the receiving devices 127, 128 and/or the central server may determine that the second scanning device **122*b* is located in the second room 124. Thus, if the second scanning device 122*b* requires a configuration update, the second receiving device 127 may establish a connection 133 with the second scanning device 122*b* to transmit the configuration update instruction(s). The second receiving device 127 and/or the central server may analyze the dataset included in the signal 131*a*, determine that the second scanning device 122*b* requires an adjustment to the data formatting settings, and the second receiving device 127 may establish the connection 133 (e.g., instant direct connect via BLE, fast file transfer connection) to the second scanning device 122*b*. The second receiving device 127 may then transmit a configuration update instruction to the second scanning device 122*b* across the connection 133 to cause the second scanning device 122*b* to adjust the data formatting settings in accordance with the requirements corresponding to the second room 124**.

As mentioned, each of the connections 132, 133 may be any suitable connection (e.g., instant direct connection via BLE, fast file transfer, etc.) having any suitable data packet size limits, transmission rates, bandwidth limitations, and/or other suitable parameters or combinations thereof. The receiving devices 126, 127, 128 may also transmit configuration update instructions across these connections to perform any suitable control functions. For example, the configuration update instructions may cause and/or otherwise result in adjusting configuration settings of the scanning devices **122*a*, 122*b*, querying battery/charging information of the scanning devices 122*a*, 122*b*, activating a function of the scanning devices 122*a*, 122*b***, and/or any other suitable functions or combinations thereof.

It should be understood that the scanning devices (e.g., scanning devices 102, **122*a*, 122*b*), receiving devices (e.g., receiving devices 104, 126, 127, 128), and central servers (e.g., central server 105**) described herein are for the purposes of discussion only. The techniques described herein may be used to simultaneously control, manage, and/or otherwise track any suitable number of scanning devices and/or other suitable devices, and such devices may connect and/or otherwise transmit beacon signals to any suitable number of secondary devices and/or other suitable devices (e.g., Internet of Things (IoT) bridge).

Figure 2:
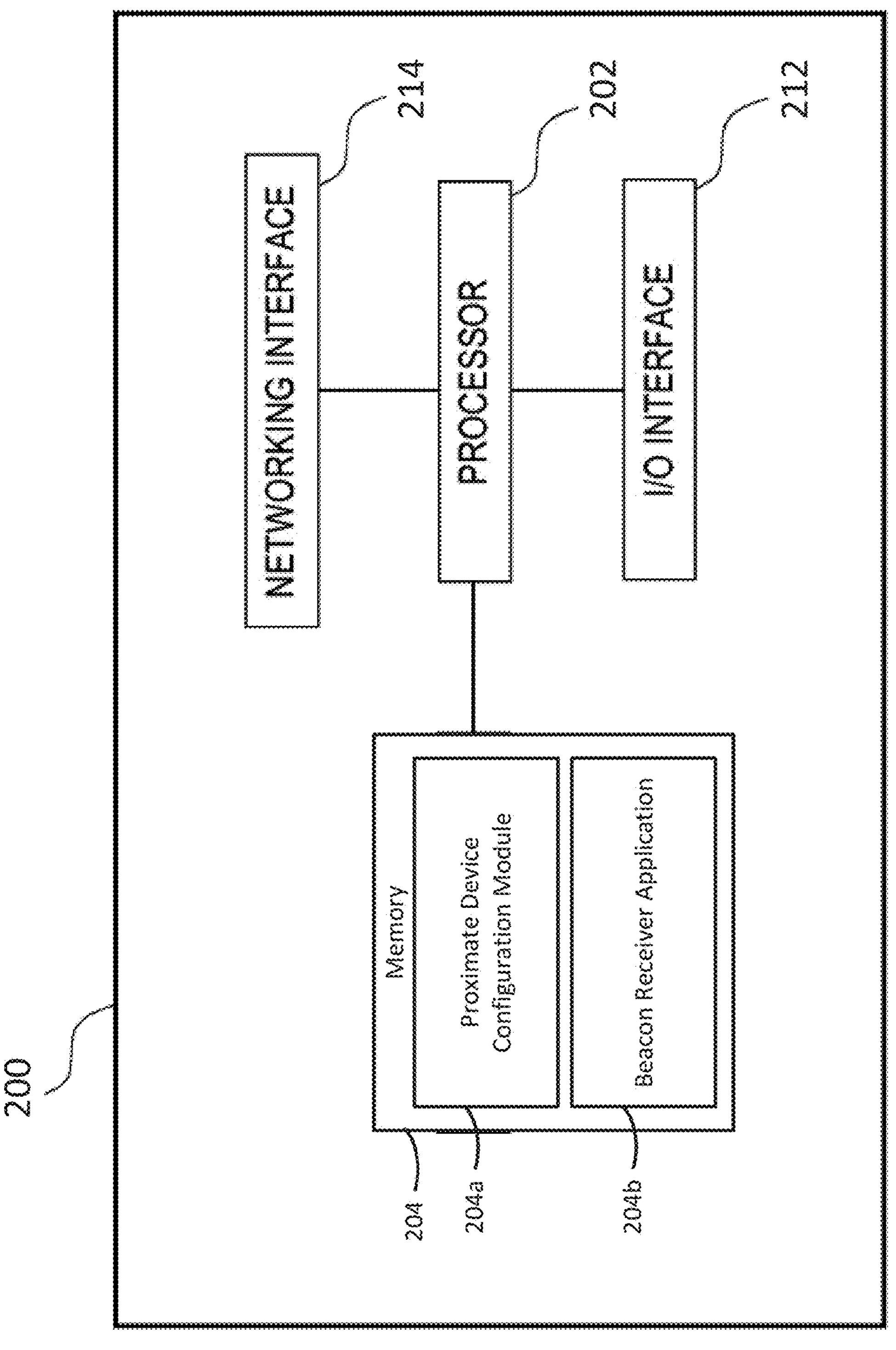
FIG. 2 is a block diagram of an example logic circuit for implementing example methods and/or operations described herein.

FIG. 2 is a block diagram representative of an example logic circuit capable of implementing, for example, one or more components of the receiver device 104 and/or the central server 105 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. The memory 204 also includes a proximate device configuration module **204*a* and a beacon receiver application 204*b* that are accessible by the example processor 202**.

The proximate device configuration module **204*a* may comprise or represent rule-based instructions, an artificial intelligence (AI) and/or machine learning-based model(s), and/or any other suitable algorithm architecture or combination thereof configured to, for example, perform device control and configuration operations for a scanning device (e.g., scanning device 102). To illustrate, the example processor 202 may access the memory 204 to execute the proximate device configuration module 204*a* and determine whether a proximate device requires control/configuration adjustments and what configuration update instruction to provide the proximate device. More generally, the proximate device configuration module 204*a* may include executable instructions configured to analyze a dataset included as part of a signal received from a proximate device and determine whether and how the proximate device requires control (e.g., configuration adjustments). After determining whether and how the proximate device requires control, the proximate device configuration module 204*a*** may also generate and/or otherwise inform a configuration update instruction configured to perform and/or otherwise cause the proximate device to perform the determined configuration update.

The beacon receiver application **204*b* may comprise or represent rule-based instructions, an artificial intelligence (AI) and/or machine learning-based model(s), and/or any other suitable algorithm architecture or combination thereof configured to, for example, receive and interpret signals received from proximate devices. As an example, the beacon receiver application 204*b* may include executable instructions configured to interpret data packets structured in conformance with a BLE beaconing communication protocol and/or any other suitable communication protocol. To illustrate, the example processor 202 may access the memory 204 to execute the beacon receiver application 204*b* and interpret a BLE beacon signal received via the networking interface 214**.

Additionally, or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a networking interface 214 to enable communication with other machines via, for example, one or more networks. The example networking interface 214 includes any suitable type of communication interface(s) (e.g., wired and/or wireless interfaces) configured to operate in accordance with any suitable protocol(s) (e.g., BLE, Wi-fi, Ethernet for wired communications and/or IEEE 802.11 for wireless communications). For example, the example processing platform 200 may be communicatively connected with a proximate device (e.g., scanning devices 102, 122*a*, 122*b*) through the networking interface 214, such that the platform 200 may transmit/receive data to/from the proximate device. Additionally, the processors 202 may execute instructions of the proximate device configuration module 204*a* and/or the beacon receiver application 204*b* stored in memory 204 to receive and interpret beacon signals and to transmit configuration update instructions to proximate devices via the networking interface 214.

The example processing platform 200 of FIG. 2 also includes input/output (I/O) interfaces 212 to enable receipt of user input and communication of output data to the user. Such user input and communication may include, for example, any number of keyboards, mice, USB drives, optical drives, screens, touchscreens, etc. The I/O interfaces 212 may enable a user to input data, such as a desired geofence boundaries, configuration settings, battery charging/charge settings, which the processors 202 may use to determine configuration update instructions for proximate devices, in accordance with instructions included as part of the proximate device configuration module 204*a* and/or the beacon receiver application 204*b*.

Of course, it should be appreciated that, while the various components of the example processing platform 200 (e.g., processors 202, memory 204, etc.) are illustrated in FIG. 2 as single components, the example processing platform 200 may include multiple of each of the components.

Figure 3A:
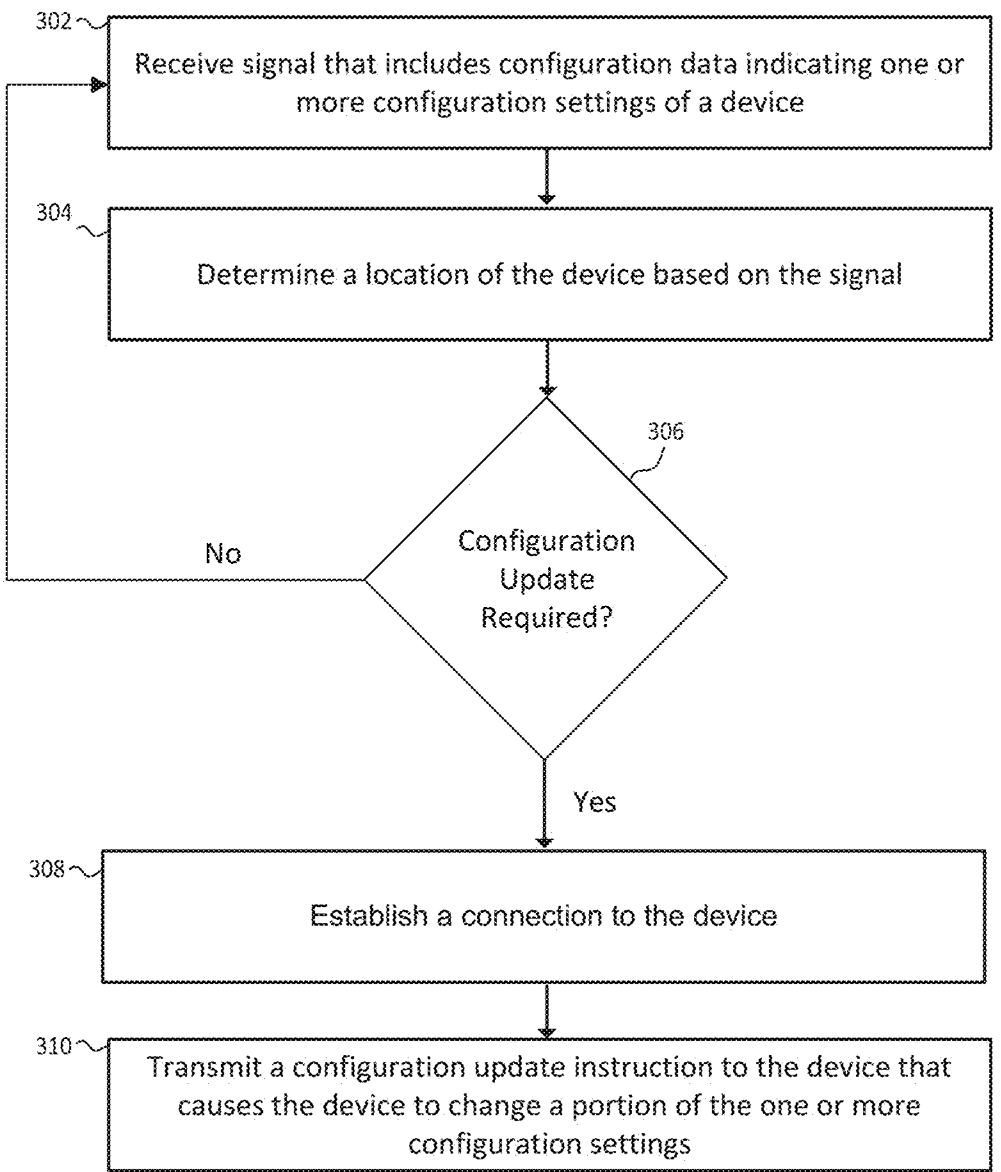
FIGS. 3A and 3B are flowcharts representative of various methods for location-based device configuration, in accordance with embodiments described herein.

FIG. 3A is a flowchart representative of a method 300 for location-based device configuration, in accordance with embodiments described herein. It is to be understood that any of the steps of the method 300 may be performed by, for example, the receiver device 104, a proximate device (e.g., scanning device 102, 122*a*, 122*b*), the central server 105, and/or any other suitable components, components contained therein, and/or combinations thereof discussed herein.

At block 302, the method 300 includes receiving a signal that includes configuration data indicating one or more configuration settings of a device. The method 300 may further include determining a location of the device based on the signal (block 304). The method 300 may further include analyzing the location of the device and the configuration data to determine whether a configuration update of the device is required (block 306).

For example, the receiving device may analyze the dataset included as part of the transmitted signal (e.g., beacon) and determine that a configuration setting (e.g., beeper volume level, emitted illumination level, symbology analysis/capture settings, etc.) does not comply and/or otherwise differs from the required configuration settings associated with the current location of the scanning device. The receiving device may thereby determine that the scanning device requires re-configuration/adjustment to, for example, reduce, increase, and/or otherwise adjust certain functions (e.g., output illumination levels), output an alert signal (e.g., flashing light, audio output, haptic feedback) indicating the configuration changes/adjustments, and/or any other suitable control or combinations thereof.

If the receiving device determines that configuration update is not required (NO branch of block 306), then the method 300 may include returning to block 302. The scanning device may continue emitting beacons and/or other suitable signals to be received by the receiving device, and the receiving device may continue receiving the signals while the receiving device is within receiving range of the signals. For example, the scanning device may periodically emit a signal/beacon every second, millisecond, several milliseconds/seconds, minute, several minutes, and/or any other suitable frequency.

However, if the receiving device determines that a configuration update is required (YES branch of block 306), the method 300 may include establishing a connection to the proximate device (block 308). When the receiving device establishes the connection to the proximate device, the method 300 may further include the receiving device transmitting a configuration update instruction to the proximate device that causes the proximate device to change a portion of one or more configuration settings (block 310). As previously mentioned, the configuration update instruction may include and/or correspond to any suitable control function, such as adjusting configuration settings, querying battery/charging information of scanning devices, activating a function of a scanning device, and/or any other suitable functions or combinations thereof.

In certain embodiments, the configuration data may be a first configuration data, and the method 300 may further comprise: determining the location of the device based on an RSSI value associated with the signal, and analyzing the location of the device and the first configuration data by comparing the first configuration data with a second configuration data associated with the location. In these embodiments, the method 300 may further include determining that a first configuration setting indicated in the first configuration data is different from a corresponding second configuration setting in the second configuration data, and determining, based on the first configuration setting differing from the corresponding second configuration setting, that the configuration update is required.

In some embodiments, the one or more configuration settings may include one or more of: (i) an audio output volume, (ii) an illumination output level, (iii) a symbology capture setting, (iv) a data formatting setting, and (v) a haptic feedback level.

In certain embodiments, the connection may comprise at least one of: (i) an instant direct connection to the device via Bluetooth® Low Energy (BLE) having a first transmission size limit and/or (ii) a fast file transfer channel having a second transmission size limit.

In some embodiments, the method 300 may further comprise: receiving a plurality of signals that each include respective configuration data indicating one or more respective configuration settings of a respective device and determining whether any respective device requires a respective configuration update. In these embodiments, the method 300 may further include substantially simultaneously establishing a respective connection to each respective device and transmitting a respective configuration update instruction to each device across the respective connections that causes each respective device to change a respective portion of the one or more respective configuration settings.

In certain embodiments, the signal may be a BLE signal transmitted by the device as a periodic beacon. Further, in some embodiments, the configuration update instruction may further cause the device to output a feedback response (e.g., flashing light, audio output, haptic feedback, etc.) for a user indicating the change of the portion of the one or more configuration settings.

Figure 3B:
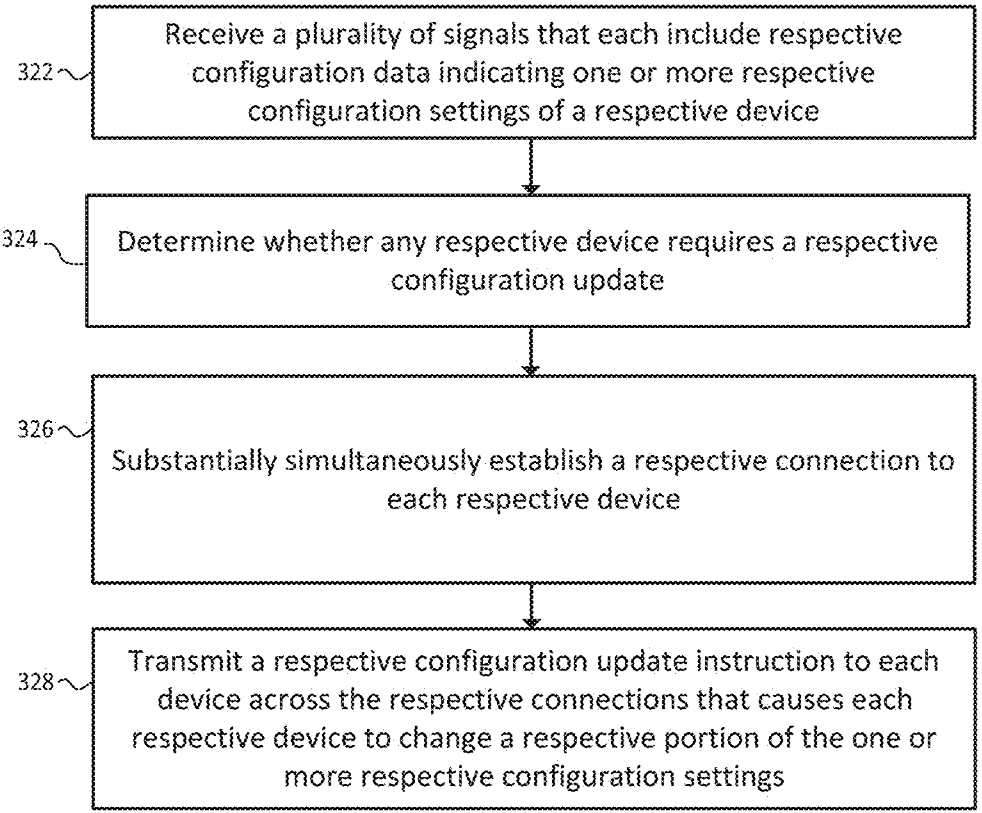

FIG. 3B is a flowchart representative of a method 320 for location-based device configuration, in accordance with embodiments described herein. It is to be understood that any of the steps of the method 320 may be performed by, for example, the receiver device 104, a proximate device (e.g., scanning device 102), the central server 105, and/or any other suitable components, components contained therein, and/or combinations thereof discussed herein.

At block 322, the method 320 may include receiving a plurality of signals that each include respective configuration data indicating one or more respective configuration settings of a respective device. Each respective signal of the plurality of signals may include a respective dataset corresponding to the respective proximate device. For example, a first proximate device, a second proximate device, and a third proximate device may each transmit signals received at a receiving device located in a first room/location. The signal transmitted by the first proximate device may include a first respective dataset indicating that the signal has a strong RSSI value and that the first proximate device has at least one configuration setting that differs from the required configuration settings of the first room/location. The signal transmitted by the second proximate device may include a second respective dataset indicating that the signal has a relatively weak RSSI value and that the second proximate device has no configuration settings that differ from the required configuration settings of the first room/location. The signal transmitted by the third proximate device may include a third respective dataset indicating that the signal has a very weak RSSI value and that the third proximate device has at least one configuration setting that differs from the required configuration settings of the first room/location.

The method 320 may further include analyzing each respective dataset to determine whether any respective device requires a respective configuration update (block 324). Continuing the prior example, the receiving device may determine that the first proximate device requires a configuration update/adjustment because the first proximate device is likely located in the first room/location and has a configuration setting that differs from the required configuration settings of the first room/location. The receiving device may also determine that the second proximate devices does not require a configuration adjustment because (i) the second proximate device does not have any configuration settings that differ from the required configuration settings of the first room/location, and (ii) the second proximate device may not be located in the first room/location in any event. The receiving device may also determine that the third proximate device does not require a configuration update/adjustment because, despite the third proximate device having a configuration setting that differs from the required configuration settings of the first room/location, the third proximate device is likely not located in the first room/location (e.g., based on the very weak RSSI value).

The method 320 may further include substantially simultaneously establishing a respective connection to each proximate device that requires a respective configuration update (block 326). Further in the prior example, the receiving device may establish a connection (e.g., instant direct connection via BLE, fast file transfer connection) to the first proximate device. Of course, the receiving device may not establish a connection to the second proximate device or the third proximate device, as the receiving device determined that the second proximate device and the third proximate device do not currently require configuration updates/adjustments.

The method 320 may further include transmitting a respective configuration update instruction to each device across the respective connections that causes each respective device to change a respective portion of the one or more respective configuration settings (block 328). Continuing the prior example, the receiving device may transmit a configuration update instruction to the first proximate device across the respective connection to the first proximate device causing the first proximate device to adjust the configuration setting(s) that did not conform to the requirements of the first room/location.

Of course, it is to be appreciated that the actions of any of the methods 300, 320 may be performed any suitable number of times, and that the actions described in reference to any of the methods 300, 320 may be performed any suitable number of times and in any suitable order.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope f present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for location-based mobile device configuration, the system comprising:

one or more processors; and one or more memories storing instructions thereon that, when executed by the one or more processors, are configured to cause the system to:

receive, by a fixed device, a signal that includes first configuration data indicating one or more configuration settings of a mobile device, determine a location of the mobile device based on a received signal strength indicator (RSSI) value associated with the signal relative to the fixed device, determine whether a configuration update of the mobile device is required by comparing the first configuration data of the mobile device with a second configuration data associated with the location, responsive to determining that the configuration update is required, establish a connection between the fixed device and the mobile device, and transmit, from the fixed device, a configuration update instruction to the mobile device that causes the mobile device to change a portion of the one or more configuration settings.

2. The system of claim 1, wherein the instructions, when executed by the one or more processors, further cause the system to:

determine that a first configuration setting indicated in the first configuration data is different from a corresponding second configuration setting in the second configuration data; and determine, based on the first configuration setting differing from the corresponding second configuration setting, that the configuration update is required.

3. The system of claim 1, wherein the one or more configuration settings include one or more of: (i) an audio output volume, (ii) an illumination output level, (iii) a symbology capture setting, (iv) a data formatting setting, and (v) a haptic feedback level.

4. The system of claim 1, wherein the connection comprises at least one of: (i) an instant direct connection to the device via Bluetooth® Low Energy (BLE) having a first transmission size limit or (ii) a fast file transfer channel having a second transmission size limit.

5. The system of claim 1, wherein the instructions, when executed by the one or more processors, further cause the system to:

receive a plurality of signals that each include respective configuration data indicating one or more respective configuration settings of a respective mobile device;

determine whether any respective mobile device requires a respective configuration update;

substantially simultaneously establish a respective connection to each respective mobile device; and transmit a respective configuration update instruction to each mobile device across the respective connections that causes each respective mobile device to change a respective portion of the one or more respective configuration settings.

6. The system of claim 1, wherein the signal is a BLE signal transmitted by the mobile device as a periodic beacon.

7. The system of claim 1, wherein the configuration update instruction further causes the mobile device to output a feedback response for a user indicating the change of the portion of the one or more configuration settings.

8. A computer-implemented method for location-based mobile device configuration, the method comprising:

receiving, by a fixed device, a signal that includes first configuration data indicating one or more configuration settings of a mobile device;

determining a location of the mobile device based on a received signal strength indicator (RSSI) value associated with the signal relative to the fixed device;

determining whether a configuration update of the mobile device is required by comparing the first configuration data of the mobile device with a second configuration data associated with the location;

responsive to determining that the configuration update is required, establishing a connection between the fixed device and the mobile device; and transmitting, from the fixed device, a configuration update instruction to the device that causes the mobile device to change a portion of the one or more configuration settings.

9. The computer-implemented method of claim 8, further comprising:

determining that a first configuration setting indicated in the first configuration data is different from a corresponding second configuration setting in the second configuration data; and determining, based on the first configuration setting differing from the corresponding second configuration setting, that the configuration update is required.

10. The computer-implemented method of claim 8, wherein the one or more configuration settings include one or more of: (i) an audio output volume, (ii) an illumination output level, (iii) a symbology capture setting, (iv) a data formatting setting, and (v) a haptic feedback level.

11. The computer-implemented method of claim 8, wherein the connection comprises at least one of: (i) an instant direct connection to the device via Bluetooth® Low Energy (BLE) having a first transmission size limit or (ii) a fast file transfer channel having a second transmission size limit.

12. The computer-implemented method of claim 8, further comprising:

receiving a plurality of signals that each include respective configuration data indicating one or more respective configuration settings of a respective mobile device;

determining whether any respective mobile device requires a respective configuration update;

substantially simultaneously establishing a respective connection to each respective mobile device; and transmitting a respective configuration update instruction to each mobile device across the respective connections that causes each respective device to change a respective portion of the one or more respective configuration settings.

13. The computer-implemented method of claim 8, wherein the signal is a BLE signal transmitted by the mobile device as a periodic beacon.

14. The computer-implemented method of claim 8, wherein the configuration update instruction further causes the mobile device to output a feedback response for a user indicating the change of the portion of the one or more configuration settings.

15. A tangible machine-readable medium comprising instructions for location-based mobile device configuration that, when executed, cause a machine to at least:

receive, by a fixed device, a signal that includes first configuration data indicating one or more configuration settings of a mobile device;

determine a location of the mobile device based on a received signal strength indicator (RSSI) value associated with the signal relative to the fixed device;

determine whether a configuration update of the mobile device is required by comparing the first configuration data of the mobile device with a second configuration data associated with the location;

responsive to determining that the configuration update is required, establish a connection between the fixed device and the mobile device; and transmit, from the fixed device, a configuration update instruction to the device that causes the mobile device to change a portion of the one or more configuration settings.

16. The tangible machine-readable medium of claim 15, wherein the instructions, when executed, further cause the machine to at least:

determine that a first configuration setting indicated in the first configuration data is different from a corresponding second configuration setting in the second configuration data; and determine, based on the first configuration setting differing from the corresponding second configuration setting, that the configuration update is required.

17. The tangible machine-readable medium of claim 15, wherein the one or more configuration settings include one or more of: (i) an audio output volume, (ii) an illumination output level, (iii) a symbology capture setting, (iv) a data formatting setting, and (v) a haptic feedback level.

18. The tangible machine-readable medium of claim 15, wherein the connection comprises at least one of: (i) an instant direct connection to the device via Bluetooth® Low Energy (BLE) having a first transmission size limit or (ii) a fast file transfer channel having a second transmission size limit.

19. The tangible machine-readable medium of claim 15, wherein the instructions, when executed, further cause the machine to at least:

receive a plurality of signals that each include respective configuration data indicating one or more respective configuration settings of a respective mobile device;

determine whether any respective mobile device requires a respective configuration update;

substantially simultaneously establish a respective connection to each respective mobile device; and transmit a respective configuration update instruction to each mobile device across the respective connections that causes each respective device to change a respective portion of the one or more respective configuration settings.

20. The tangible machine-readable medium of claim 15, wherein the signal is a BLE signal transmitted by the mobile device as a periodic beacon.

* * * * *